(12) United States Patent
Khosrowpour et al.

(10) Patent No.: US 10,771,580 B1
(45) Date of Patent: Sep. 8, 2020

(54) USING MACHINE LEARNING TO IMPROVE INPUT/OUTPUT PERFORMANCE OF AN APPLICATION

(71) Applicant: Dell Products L. P., Round Rock, TX (US)

(72) Inventors: Farzad Khosrowpour, Pflugerville, TX (US); Nikhil Vichare, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 16/353,153

(22) Filed: Mar. 14, 2019

(51) Int. Cl.
| | |
|---|---|
| *G06F 9/48* | (2006.01) |
| *G06F 3/06* | (2006.01) |
| *H04L 29/08* | (2006.01) |
| *G06F 9/50* | (2006.01) |
| *G06K 9/62* | (2006.01) |
| *G06N 20/00* | (2019.01) |

(52) U.S. Cl.
CPC .......... *H04L 67/2819* (2013.01); *G06F 9/505* (2013.01); *G06K 9/6256* (2013.01); *G06K 9/6264* (2013.01); *G06N 20/00* (2019.01)

(58) Field of Classification Search
CPC ..... H04L 67/2819; G06N 20/00; G06F 9/505; G06K 9/6256; G06K 9/6264
USPC ......................................................... 709/223
See application file for complete search history.

(56) References Cited

U.S. PATENT DOCUMENTS

| | | | | |
|---|---|---|---|---|
| 6,775,745 | B1* | 8/2004 | Fry | G06F 12/0866 711/118 |
| 7,898,442 | B1* | 3/2011 | Sovik | H03M 7/3088 341/51 |
| 8,239,584 | B1* | 8/2012 | Rabe | G06F 3/0605 710/8 |
| 10,430,206 | B1* | 10/2019 | Hoffmann | G06F 21/629 |
| 2010/0185942 | A1* | 7/2010 | Watariuchi | H04N 1/00222 715/248 |
| 2012/0262463 | A1* | 10/2012 | Bakalash | H04N 21/42653 345/501 |
| 2013/0073884 | A1* | 3/2013 | Ulmer | G06F 1/3203 713/320 |

(Continued)

OTHER PUBLICATIONS

Intel Cache Acceleration Software (Intel CAS), "Improve Application Performance", downloaded from www.https://www.intel.com/content/www/us/en/software/intel-cache-acceleration-software-performance.html; downloaded on Nov. 1, 2018, pp. 1-6.

*Primary Examiner* — Tonia L Dollinger
*Assistant Examiner* — Schquita D Goodwin
(74) *Attorney, Agent, or Firm* — Campbell Stephenson LLP; Shiv S. Naimpally

(57) ABSTRACT

In some examples, a computing device may determine that a selected application is executing and gather, over a predetermined time interval, data associated with operations being performed to the input/output stack by the selected application. After gathering the data, a classifier may analyze the data and determine a particular workload type from a predefined set of workload types associated with the selected application. The computing device may select a particular profile from a plurality of predefined profiles based at least in part on the particular workload type, and modify, based on the particular profile, a plurality of parameters to create a plurality of modified parameters. The modified parameters may reduce an execution time of performing the operations to the input/output stack.

17 Claims, 7 Drawing Sheets

(56) References Cited

U.S. PATENT DOCUMENTS

| | | | |
|---|---|---|---|
| 2014/0118263 A1* | 5/2014 | Tajima | G06F 9/451 |
| | | | 345/168 |
| 2015/0134857 A1* | 5/2015 | Hahn | G06F 3/061 |
| | | | 710/5 |
| 2015/0242133 A1* | 8/2015 | Smith | G06F 3/0613 |
| | | | 711/114 |
| 2016/0231948 A1* | 8/2016 | Gupta | G06F 3/067 |
| 2016/0283366 A1* | 9/2016 | Nguyen Tien | G06F 12/0246 |
| 2017/0109205 A1* | 4/2017 | Ahuja | G06F 9/505 |
| 2019/0034234 A1* | 1/2019 | Cheng | G06F 9/5011 |
| 2020/0034194 A1* | 1/2020 | Szczepanik | G06F 3/067 |
| 2020/0042473 A1* | 2/2020 | Dalmatov | G06N 20/00 |
| 2020/0097183 A1* | 3/2020 | Rawal | G06F 12/0891 |

\* cited by examiner

USING MACHINE LEARNING TO IMPROVE INPUT/OUTPUT PERFORMANCE OF AN APPLICATION

BACKGROUND OF THE INVENTION

Field of the Invention

This invention relates generally to computing devices and, more particularly to improving input/output (I/O) performance of one or more applications executing on a computing device.

Description of the Related Art

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is a workstation. A workstation may be used to execute applications that use a large amount of computing resources, such as, for example, central process unit (CPU) cycles, memory, storage, graphics processing unit (GPU) cycles, and the like. Examples of such computing resource-intensive applications include Adobe® Illustrator®, Adobe® After Effects®, Adobe® Media Encoder®, Adobe® Photoshop®, Adobe® Premiere®, Autodesk® AutoCAD®, Avid Media Composer®, ANSYS Fluent, ANSYS Workbench, Sonar Cakewalk, and the like.

The way in which apps access and use storage may vary based on numerous parameters. Diverse attributes of storage in a system in conjunction with the variability of workloads creates complex interactions with storage input/output (I/O). Storage in a system is a stack of software and hardware that includes files systems, volumes and volume managers, class drivers and I/O drivers, and disk subsystems. The way in which storage and memory (e.g., data cache) interact with persistent and non-persistent memory may vary in each system and according to each application workload. Disk subsystem technologies such as non-volatile memory express (NVME), rotating media (e.g., disk drives), tiered storage (e.g., drives with built-in cache) and others have different interfaces and capabilities that result in complex interactions with application workloads. The physical attributes of a system, such as single/multi physical disk devices (e.g., configured as a Redundant Array of Independent Disks (RAID)) and logical volumes creates many I/O patterns in a workstation. Storage devices are unaware of workload variations (e.g., read or write rates) and treat all I/O equally, e.g., without regard to which application provides the I/O workload. Some of the variation of load may be due to translation layers between an application I/O and disk I/O handled by the operating system. For example, I/O requests and interactions with data cache may require adjustment of memory and cache as well as physical device parameters, for each application workload.

To improve performance for applications, a workstation manufacturer may provide predefined profiles with each workstation that configure various parameters associated with the workstation's resources to improve performance for popular applications. For example, a profile may modify parameters, such as cache size, a location where a temporary file is created, memory allocation size, page size, and the like, to improve I/O performance. However, such an approach has several limitations. First, the manufacturer is only able to provide predefined profiles for popular applications because the manufacturer cannot test all available applications. Second, the manufacturer can only test applications that have been available for an amount of time sufficient to enable the manufacturer to perform testing and create the corresponding profile. Thus, if a relatively new application, a new version of an existing application, or an application that is not widely used is being executed on a workstation, then a corresponding predefined profile may not be available. Third, the predefined profiles may be created to improve performance for commonly performed tasks for popular applications. For example, the manufacturer may create a profile to improve the performance of a particular set of tasks performed using a particular application. However, if the user performs a different set of tasks using the particular application, then the predefined profile may provide minimal performance improvement or may even degrade performance. Thus, providing predefined profiles for popular applications may not significantly improve the performance of a relatively new application, a new version of an existing application, or an application that is not considered a popular application.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may perform various operations. For example, the operations may include receiving, via a user interface, a user selection of a particular application from a plurality of applications to create a selected application. The operations may include determining that the selected application is executing and accessing (e.g., performing operations to) an input/output stack of the computing device. The operations may include gathering, over a predetermined interval of time, data associated with the selected application that is performing the operations to the input/output stack. After gathering the data, the operations may include performing an analysis of the data and determining, by a classifier and based at least in part on the analysis, a particular workload type from a predefined set of workload types that is associated with the selected application. The classifier may be trained using multiple hardware platforms, multiple storage configurations, multiple workloads, and the predefined plurality of profiles to classify a workload based on input/output operations performed by a particular application and to identify a profile to increase performance of the input/output operations. The operations may include selecting a particular profile from a plurality of predefined profiles based at least in part on the particular workload type, and modifying, based on the particular profile, a plurality of parameters to create a plurality of modified parameters. The modified parameters may reduce an execution time of performing the operations to the input/output stack.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
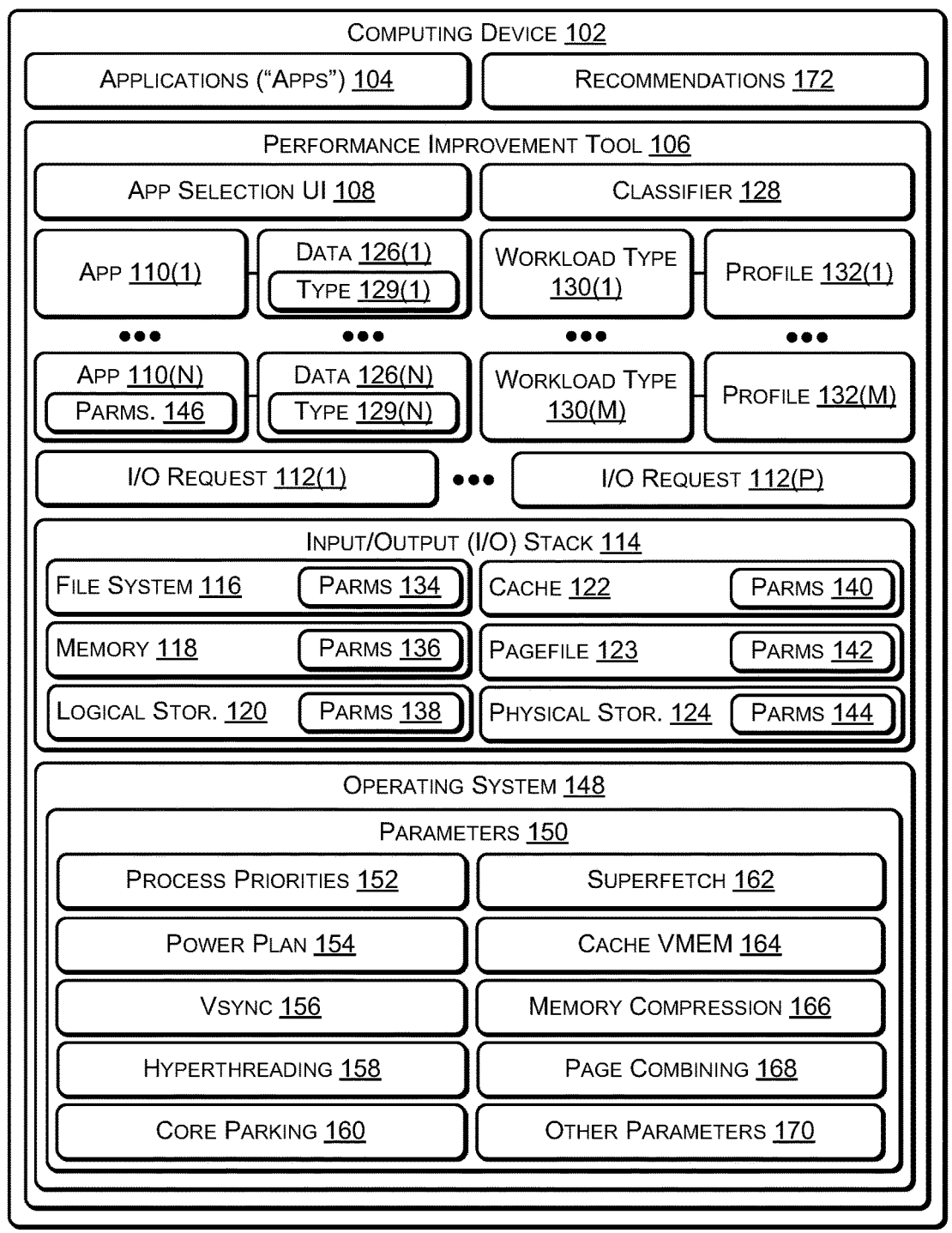
FIG. 1 is a block diagram of a computing device executing a classifier (e.g., a machine learning algorithm) that gathers data associated with an application and selects a profile to configure resources of the computing device, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein use machine learning to increase application ("app") performance related to input/output (I/O), such as read operations and write operations. The I/O in a computing device may have multiple layers, collectively referred to as an I/O stack. The computing device may use virtual memory to enable multiple apps to share a physical storage device (e.g., a disk drive). Portions (e.g., pages) of virtual memory may be stored in main memory (e.g., random access memory (RAM)) and swapped back and forth with the physical storage device. The physical storage device may use a high-speed memory, known as a cache, to increase throughput when apps access the physical storage device. For example, when an app performs a write, the app may write to virtual memory in RAM, which is then sent to the physical storage device and stored in the cache, before being written to the physical storage device. In addition, an operating system may provide a file system to enable apps to perform I/O. The file system may use blocks having a particular size such that a large file is stored as multiple blocks. The multiple blocks may be located at different locations in the physical storage device and the file system may keep track of the locations of each of the multiple blocks such that the apps are unaware that the large file is being stored as multiple blocks in multiple (e.g., non-contiguous) locations.

The systems and techniques described herein perform an analysis of how an application accesses the I/O stack and, based on the analysis, characterize the application as having a particular type of workload. The systems and techniques select a profile that is designed to improve I/O (e.g., increased throughput, faster execution, lower latency, and the like) for the particular type of workload. Each particular type of workload has particular characteristics (e.g., read/write (R/W) ratio, queue depth, block size, and the like) with regard to how the app accesses the I/O stack. The systems and techniques monitor what the app is doing to the I/O stack and identify a particular profile with settings that improve I/O performance when accessing the I/O stack (e.g., the settings improve performance as compared to the default configuration used by the operating system and the application when initially installed). Thus, each profile is designed to improve a particular type of I/O workload rather than a particular type of app, making the systems and techniques application agnostic. Thus, rather than have a first profile for a first application, a second profile for a second application, and so on, an app's I/O workload is monitored and an appropriate profile selected. In this way, new apps, less popular apps, and recently released versions of apps can be immediately supported by selecting a profile based on the application's I/O workload (e.g., rather than the name of the app). In some cases, the profile may configure parameters associated with the application to improve throughput, reduce execution time, and the like.

The system and techniques create a classifier using a machine learning algorithm such as, for example, Random Forest, Neural Network, or the like. Combinations of different hardware platforms and different storage configurations are used to execute different types of workloads using different types of profiles and data associated with the workload characteristics is gathered. The data is used to train the classifier to identify which profile (among multiple profiles that were tested) provides the highest performance (e.g., fastest execution time) for a particular workload executing on a particular hardware platform having a particular storage configuration. The workload characteristics (e.g., parameters) that are analyzed may include up to 1,000 different I/O related variables across layers of the storage stack including the physical disk, cache, logical disk, memory, and pagefile. For example, the characteristics may include (1) logical and physical I/O operation counters such as, for example, I/O Read Operations/sec, I/O Write Operation, I/O Read Operations/sec, I/O Write Operations/sec, I/O Data Operations/sec, (2) process parameters, such as, for example, Virtual Bytes, Cache Copy Read Hits %, Cache Copy Reads/Sec, Page File Bytes/sec, (3) caching and operating system (OS) information, such as, for example, Cache Copy Read Hits %, Cache Copy Reads/Sec, and Page File Bytes, and the like. The classifier identifies which profile from among multiple tested profiled provides the most efficient usage of I/O resources to achieve faster throughput, faster execution time, and the like reduces the impact on the user.

After the classifier is trained, the classifier may identify a subset (e.g., top N, where 0<N<100) of the up to 1,000 I/O related parameters. The subset is typically between about 50 to about 100 parameters, and may typically be about 70 parameters. The subset of parameters may be those parameters that have the highest influence on increasing throughput, e.g., the parameters that, when varied, cause the largest change (e.g., improvement) and provide the most "bang for the buck". The subset of parameters are later used when the classifier is deployed to classify a workload. One of the reasons for determining the subset of parameters is because monitoring up to 1,000 parameters on a user's computing device would significantly slow down execution of apps. In contrast, monitoring the subset of I/O parameters for a predetermined period of time (e.g., 30, 60, 90, 120 minutes, or the like) when a particular app is being used reduces the impact on the user. The subset of parameters may include, for example, Cache\Async Copy Reads/sec, Cache\Copy Read Hits %, Cache\Copy Reads/sec, Cache\Data Map Hits %, Cache\Data Maps/sec, Cache\Dirty Page Threshold, Cache\Dirty Pages, Cache\MDL Read Hits %, Cache\MDL Reads/sec, Cache\Pin Read Hits %, Cache\Pin Reads/sec, Cache\Read Aheads/sec, LogicalDisk(Total)\% Disk Read Time, LogicalDisk(Total)\% Disk Time, LogicalDisk(Total)\% Disk Write Time, LogicalDisk(Total)\Avg. Disk Bytes/Write, LogicalDisk(Total)\Avg. Disk Queue Length, LogicalDisk(Total)\Avg. Disk Read Queue Length, LogicalDisk(Total)\Avg. Disk sec/Transfer, LogicalDisk(Total)\Avg. Disk Write Queue Length, LogicalDisk(Total)\Current Disk Queue Length, LogicalDisk(Total)\Disk Bytes/sec, LogicalDisk(Total)\Disk Read Bytes/sec, LogicalDisk(Total)\Disk Transfers/sec, LogicalDisk(Total)\Disk Write Bytes/sec, Memory\% Committed Bytes In Use, Memory\Available Bytes, Memory\Available KBytes, Memory\Available MBytes, Memory\Cache Bytes, Memory\Cache Faults/sec, Memory\Committed Bytes, Memory\Free & Zero Page List Bytes, Memory\Free System Page Table Entries, Memory\Modified Page List Bytes, Memory\Page Faults/sec, Memory\Page Reads/sec, Memory\Page Writes/sec, Memory\Pages Input/sec, Memory\Pages Output/sec, Memory\Pages/sec, Memory\Pool Nonpaged Allocs, Memory\Pool Nonpaged Bytes, Memory\Pool Paged Allocs, Memory\Pool Paged Bytes, Memory\Pool Paged Resident Bytes, Memory\Standby Cache Core Bytes, Memory\Standby Cache Normal Priority Bytes, Memory\Standby Cache Reserve Bytes, Memory\System Cache Resident Bytes, Memory\System Driver Resident Bytes, Memory\System Driver Total Bytes, PhysicalDisk(Total)\% Disk Read Time, PhysicalDisk(Total)\% Disk Time, PhysicalDisk(Total)\% Disk Write Time, PhysicalDisk(Total)\Avg. Disk Bytes/Read, PhysicalDisk(Total)\Avg. Disk Bytes/Write, PhysicalDisk(Total)\Avg. Disk Read Queue Length, PhysicalDisk(Total)\Avg. Disk sec/Transfer, PhysicalDisk(Total)\Avg. Disk Write Queue Length, PhysicalDisk(Total)\Current Disk Queue Length, Process(beast)\% Privileged Time, Process(beast)\Elapsed Time, Process(beast)\% Processor Time, Process(beast)\IO Data Bytes/sec, Process(beast)\IO Data Operations/sec, Process(beast)\IO Other Bytes/sec, Process(beast)\IO Other Operations/sec, Process(beast)\IO Read Bytes/sec, Process(beast)\IO Read Operations/sec, Process(beast)\IO Write Bytes/sec, Process(beast)\IO Write Operations/sec, Process(beast)\Page File Bytes, Process(beast)\Page File Bytes Peak, Process(beast)\Page Faults/sec, Process(beast)\Priority Base, Process(beast)\Thread Count, Process(beast)\Pool Nonpaged Bytes, Process(beast)\Pool Paged Bytes, Process(beast)\Private Bytes, Process(beast)\Virtual Bytes, Process(beast)\Virtual Bytes Peak, Process(beast)\Working Set, Process(beast)\Working Set—Private, Process(beast)\Working Set Peak, Processor(Total)\DPC Rate, Processor(Total)\DPCs Queued/sec, Processor(Total)\Interrupts/sec, System\Context Switches/sec, System\File Read Bytes/sec, System\File Read Operations/sec, System\File Write Bytes/sec, System\File Write Operations/sec, System\Processor Queue Length, and System\System Up Time.

After the classifier has been trained, a performance improvement software application (e.g., Dell® Precision Optimizer or the like) that includes the classifier may be deployed (e.g., installed) on workstations (e.g., information handling systems). The software application may provide a user interface (UI) that enables a user to select one or more apps (e.g., Adobe® Illustrator®, Adobe® After Effects®, Adobe® Media Encoder®, Adobe® Photoshop®, Adobe® Premiere®, Autodesk® AutoCAD®, Avid Media Composer®, ANSYS Fluent, ANSYS Workbench, Sonar Cakewalk, and the like). After the user selects one or more apps, the software application may monitor apps executing on the workstation. When the software application determines that one of the selected apps is executing, the software application may gather data associated with the subset of I/O parameters for a predetermined period of time (e.g., 15, 30, 45, 60 minutes or the like). For each of the selected apps, the classifier may use the gathered data to characterize the workload for each of the selected apps, select a profile that corresponds to the workload, and apply the profile by configuring various I/O related parameters (e.g., size of cache, size of pagefile, location of temporary files, and the like) of the workstation. For example, the classifier may have identified a particular set of workloads (e.g., between 10 and 50 different types of workloads) that encompass the majority of the workloads presented by different applications. To illustrate, in some cases, the classifier may identify about 25 workloads and 25 corresponding profiles.

The training data for the classifier may be gathered using different types of storage devices with different types of interfaces. For example, different amounts of RAM, different types of storage, and the like may be used to generate the training data. The different types of storage may include mechanical-based disk drivers and solid-state drives (SSD) that use different types of interfaces, such as serial ATA (SATA), Non-Volatile Memory Express (NVMe), or the like. When the classifier is deployed (e.g., after being trained), the classifier may provide recommendations to improve performance, such as, for example, "Increasing RAM from 8 GB to 16 GB will provide up to X % improvement in execution times", "Switching from a first type of storage device (e.g., mechanical disk drive) to a second type of storage device (e.g., SSD) may provide up to Y % improvement in execution times, and switching to a third type of storage device (e.g., NVME) may provide up to Z % improvement in execution times." (X, Y, and Z>0)

Thus, the systems and techniques described herein provide a way to characterize, at runtime, an application workload and improve the performance, in terms of storage I/O (e.g., the storage stack, from the file system to the physical device). A machine learning system is used to gather data associated with an app's workload (e.g., the way in which the app performs I/O), select a similar predetermined workload to the app's workload from a set of predefined workloads, select a corresponding profile to the similar predetermined workload, and configure parameters associated with the I/O (e.g., operating system parameters, device driver parameters, app parameters, device parameters, and the like) to improve the app's I/O performance. The performance improvements may result in the same task executing faster after the profile is applied as compared to before the profile is applied, executing more tasks in a particular period of time, and the like. The systems and techniques improve (e.g., optimize) native application performance by analyzing data across layers of the storage stack including the physical disk, cache, logical disk, memory and pagefile to allow the application to make the best use of the relevant computing resources (e.g., storage-related resources).

Classifier Trained in a Non-Production Environment

A classifier is trained in a non-production environment (e.g., a lab environment). A set of parameters (e.g., up to 1,000, in some cases around 700) are used to characterize each workload. The workloads are executed on different types of platforms having different configurations and different types of storage types. For example, a platform may be a particular motherboard version with a particular chip set. For each platform, the configurations may vary based on, for example, the type of processor (e.g., Intel® i3, i5, i7, and the like), the processor generation, the clock speed, the amount of RAM, the amount of storage, the type of storage (e.g., mechanical, SSD, or the like), the storage interface (e.g., SATA-3, SATA-6, NVME, or the like), and the like. The set of parameters used to characterize the workload may include variables and counters, such as, for example, (1) logical and physical I/O operation counters, such as I/O Read Operations/sec, I/O Write Operation, I/O Read Operations/sec, I/O Write Operations/sec, and I/O Data Operations/sec, (2) process parameters, such as, for example, Virtual Bytes, Cache Copy Read Hits %, Cache Copy Reads/Sec, and Page File Bytes/sec, (3) caching and O/S information, such as, for example, Cache Copy Read Hits %, Cache Copy Reads/Sec, and Page File Bytes, and the like. The parameters are measured when the application is performing different tasks (e.g., workloads) and used to determine the I/O profile of the application. The influence of each of the parameters is ranked using Mean Decrease Gini (e.g., based on Random Forest) and a subset of the parameters are selected based on the ranking (e.g., the N highest ranked parameters are selected, N>0).

In some cases, the workloads may be grouped based on a similarity of the parameters to consolidate and reduce the number of workloads. For example, if a number (e.g., M>0) of the highest ranked parameters are similar, e.g., within a predetermined range, then the workloads may be grouped into a single workload, e.g., a particular workload in which a first parameter is within a first range, a second parameter is within a second range, and so on. At runtime, the parameters for a workload may be determined and compared with the workloads identified in the non-production environment to determine a closest matching workload. Because each application may have different I/O behavior, benchmarking tools may be used to classify of workloads based on a particular set of characteristics, such as, for example, a ratio of reads to writes, block size, and the like. A correlational analysis may be used to rank a dependency level between characteristics to enable each workload type to be uniquely identified based on the measured characteristics of a workload. Based on application behavior with regard to I/O (e.g., system storage), a machine learning classifier is trained to classify a workload based on measuring a set of parameters over a period of time and select a profile corresponding to the workload.

The data used to train the classifier is generated by executing different types of workloads across multiple platforms using variations of multiple parameters. The classifier identifies parameter settings that increase the performance of particular types of workloads in terms of bandwidth, input/output operations per second (IOPS), latency, and the like. For example, each workload from multiple workloads is executed on different hardware configurations and the performance measured (e.g., read performance, write performance, read/write performance, and the like). The process of executing different workloads is repeated while varying the values of the performance variables to create a tree structure for the resulting data. The tree structure is used by the machine learning algorithm to make a decision as to the configuration that provides the highest performance for a particular application that provides a particular type of I/O workload. At runtime, the trained machine learning model (such as supervised or deep learning) is deployed on client devices. The trained machine learning model is a predictive model, e.g., $Y=F(X_1 \ldots X_N)$, where a profile Y is selected (e.g., predicted) as a function of the workload X.

Trained Classifier Used at Runtime

The trained classifier is installed and shipped with systems (e.g., workstations, such as Dell® Precision) that may be used to execute applications that use a significant amount of computing resources, such as storage I/O. A UI enables a user to select one or more apps. When one of the selected apps is executing, the subset of parameters (e.g., that most influence I/O operations) are measured for a predetermined period of time. The data gathered by monitoring the subset of parameters is used with a decision tree to identify a profile with configuration settings to improve performance. Thus, a profile may be selected at runtime to improve performance for a particular application.

As an example, a computing device may include one or more processors and one or more non-transitory computer readable media storing instructions executable by the one or more processors to perform various operations. For example, the operations may include displaying a user interface (UI) and receiving, via the UI, a user selection of a particular application from a plurality of applications to create a selected application. The plurality of applications may include, for example, Adobe® Illustrator®, Adobe® After Effects®, Adobe® Media Encoder®, Adobe® Photoshop®, Adobe® Premiere®, Autodesk® AutoCAD®, Avid Media Composer®, ANSYS Fluent, ANSYS Workbench, Sonar Cakewalk, or the like. The operations may include determining that the selected application is executing and performing operations to an input/output stack of the computing device. The input/output stack may include: (i) a file system used by the computing device, (ii) a random-access memory used by the computing device, (iii) a logical storage used by the operating system, (iv) a cache allocated in the random-access memory by the operating system, (v) a pagefile used by the operating system, and (vi) physical storage accessible to the operating system. The operations may include gathering, over a predetermined interval of time (e.g., fifteen minutes, thirty minutes, forty-five minutes, sixty minutes, or the like) data associated with the selected application that is performing the operations to the input/output stack. After gathering the data, the operations may include performing an analysis of the data and determining, by a classifier and based at least in part on the analysis, a particular workload type from a predefined set of workload types that is associated with the selected application. In some cases, the operations may include ordering, according to frequency of occurrence, the operations performed by the selected application to the input/output stack, determining a subset of the operations comprising a plurality of most frequently performed operations performed by the selected application to the input/output stack, comparing the subset of the operations to frequent operations associated with each of the predefined set of workload types, and determining that the subset of the operations associated with the selected application matches the frequent operations associated with the particular workload type. The classifier may be trained using multiple hardware platforms, multiple storage configurations, multiple workloads, and the predefined plurality of profiles to classify a workload based on input/output operations performed by a particular application and to identify a profile to increase performance of the input/output operations. The operations may include selecting a particular profile from a plurality of predefined profiles based at least in part on the particular workload type, and modifying, based on the particular profile, a plurality of parameters to create a plurality of modified parameters. The modified parameters may reduce an execution time of performing the operations to the input/output stack. For example, modifying the plurality of parameters to create the plurality of modified parameters comprises at least one of: modifying a process priority associated with the application (e.g., to a highest process priority), modifying a power plan of the operating system (e.g., to a high-performance power plan), modifying (e.g., enabling or disabling) a hyperthreading feature associated with the one or more processors, modifying (e.g., enabling or disabling) a core parking feature associated with the one or more processors, modifying (e.g., enabling or disabling) a compression feature to compress data stored in the random-access memory, modifying (e.g., enabling or disabling) a page combining feature of the operating system to remove duplicates of content stored in the random-access memory, modifying (e.g., enabling or disabling) a vertical synchronization feature associated with synchronizing a frame rate output of the selected application with a monitor refresh rate of a display device associated with the computing device, or modifying (e.g., enabling or disabling) a pre-fetch feature associated with the one or more processors to store frequently accessed data in a random-access memory of the computing device.

FIG. 1 is a block diagram 100 of a computing device executing a classifier (e.g., a machine learning algorithm) that gathers data associated with an application and selects a profile to configure resources of the computing device, according to some embodiments. A computing device 102 may include one or more applications 104 and a performance improvement tool 106. For example, the computing device 102 may be a workstation, such as Dell® Precision workstation (e.g., a laptop or a desktop). The applications ("apps") 104 may include one or more applications, such as, for example, Adobe® Illustrator®, Adobe® After Effects®, Adobe® Media Encoder®, Adobe® Photoshop®, Adobe® Premiere®, Autodesk® AutoCAD®, Avid Media Composer®, ANSYS Fluent, ANSYS Workbench, Sonar Cakewalk, or the like. The performance improvement tool 106 may be an application, such as, for example, Dell® Precision Optimizer or similar.

The performance improvement tool 106 may provide an app selection user interface (UI) 108 to enable a user to select one or more apps, such as apps 110(1) to app 110(N) (N>0) from among the apps 104. Thus, the apps 110 may be a subset of the applications 104. For example, in some cases, the UI 108 may enable a user to select up to five apps 110.

After the user has selected the apps 110, the performance improvement tool 106 may determine when one of the apps 110, such as the app 110(N), is being executed by the computing device 102 and monitor the input/output (I/O) requests 112(1) to 112(P) (P>0) from the app 110(N) to an I/O stack 114. The I/O stack 114 may include a file system 116, a memory 118, a logical storage 120, a cache 122, a pagefile 123, and physical storage 124. The pagefile 123 is used in paging, a type of memory management scheme by which the computing device 102 stores and retrieves data from the physical storage 124 for use in the main memory (e.g., RAM) 118. An operating system 148 may retrieve data from physical storage 124 in same-size blocks called pages (e.g., the representative pagefile 123). Paging is a part of virtual memory feature of the operating system 148 that enables the applications 104 to exceed the size of the available physical storage 124. The I/O stack 114 illustrated in FIG. 1 is merely an example and the particular layers of the I/O stack 114 may vary in different implementations based on the operating system 148, the file system 114, the physical storage 124, and the like. For example, a workstation running a different operating system 148, such as Linux® (or another Unix® variant), may have different layers in the I/O stack 114 than what is illustrated in FIG. 1.

The performance improvement tool 106 may determine when one of the apps 110, e.g., the app 110(N), is executing and monitor the I/O requests 112(1) to 112(P) to the I/O stack 114 for a predetermined amount of time (e.g., 15, 30, 45, 60 minutes or the like). During this time, the performance improvement tool 106 may gather the data 126(N) to characterize the workload presented by the app 110(N) and then select one of the profiles 132. The process of gathering the data 126(N) associated with the app 110(N) and selecting one of the profiles 132 is typically done once, e.g., after the user opens the app selection UI 108 and selects on or more of the apps 110 from the applications 104. Because the process of gathering the data 126(N) may degrade the performance of the app 110(N), the process is performed when the user desires a performance improvement in the app 110(N). Typically, after one of the profiles 132 has been selected and associated with the app 110(N), the process of gathering the data 126(N) may not subsequently be performed. However, the user may instruct the performance improvement tool 106 to gather the data 126(N) associated with the app 110(N) and select one of the profiles 132 by opening the app selection UI 108 and selecting the app 110(N). For example, if a provider of the performance improvement tool 106 makes improvements to the profiles 132 and makes new profiles available, the user may install the new profiles and instruct the performance improvement tool 106 to gather the data 126(N) associated with the app 110(N) and select one of the profiles 132 by opening the app selection UI 108 and selecting the app 110(N). As another example, the user may modify the configuration of the computing device 102 by adding more memory (e.g., RAM), adding another storage device with a faster interface (e.g., NVME instead of SATA), adding a storage device with more cache and/or faster I/O characteristics, or the like. After modifying the configuration of the computing device 102, the user may instruct the performance improvement tool 106 to gather the data 126(N) associated with the app 110(N) and select one of the profiles 132 by opening the app selection UI 108 and selecting the app 110(N).

The performance improvement tool 106 may monitor the input/output (I/O) requests 112 for each of the selected apps when each of the selected apps is executing (e.g., the first time each of the selected apps is being executed) and gather data 126(1) associated with how the app 110(1) uses the I/O stack 114 and gather data 126(N) associated with how the app 110(N) uses the I/O stack 114. The data 126(N) may be gathered across each of the layers of the I/O stack 114. For example, in a Microsoft® Windows® environment, the gathered data 126 may include between about 50 to 100 I/O related parameters (e.g., preferably about 70), such as, for example, The subset of parameters may include, for example, Cache\Async Copy Reads/sec, Cache\Copy Read Hits %, Cache\Copy Reads/sec, Cache\Data Map Hits %, Cache\Data Maps/sec, Cache\Dirty Page Threshold, Cache\Dirty Pages, Cache\MDL Read Hits %, Cache\MDL Reads/sec, Cache\Pin Read Hits %, Cache\Pin Reads/sec, Cache\Read Aheads/sec, LogicalDisk(Total)\% Disk Read Time, LogicalDisk(Total)\% Disk Time, LogicalDisk(Total)\% Disk Write Time, LogicalDisk(Total)\Avg. Disk Bytes/Write, LogicalDisk(Total)\Avg. Disk Queue Length, LogicalDisk(Total)\Avg. Disk Read Queue Length, LogicalDisk(Total)\Avg. Disk sec/Transfer, LogicalDisk(Total)\Avg. Disk Write Queue Length, LogicalDisk(Total)\Current Disk Queue Length, LogicalDisk(Total)\Disk Bytes/sec, LogicalDisk(Total)\Disk Read Bytes/sec, LogicalDisk(Total)\Disk Transfers/sec, LogicalDisk(Total)\Disk Write Bytes/sec, Memory\% Committed Bytes In Use, Memory\Available Bytes, Memory\Available KBytes, Memory\Available MBytes, Memory\Cache Bytes, Memory\Cache Faults/sec, Memory\Committed Bytes, Memory\Free & Zero Page List Bytes, Memory\Free System Page Table Entries, Memory\Modified Page List Bytes, Memory\Page Faults/sec, Memory\Page Reads/sec, Memory\Page Writes/sec, Memory\Pages Input/sec, Memory\Pages Output/sec, Memory\Pages/sec, Memory\Pool Nonpaged Allocs, Memory\Pool Nonpaged Bytes, Memory\Pool Paged Allocs, Memory\Pool Paged Bytes, Memory\Pool Paged Resident Bytes, Memory\Standby Cache Core Bytes, Memory\Standby Cache Normal Priority Bytes, Memory\Standby Cache Reserve Bytes, Memory\System Cache Resident Bytes, Memory\System Driver Resident Bytes, Memory\System Driver Total Bytes, PhysicalDisk(Total)\% Disk Read Time, PhysicalDisk(Total)\% Disk Time, PhysicalDisk(Total)\% Disk Write Time, PhysicalDisk(Total)\Avg. Disk Bytes/Read, PhysicalDisk(Total)\Avg. Disk Bytes/Write, PhysicalDisk(Total)\Avg. Disk Read Queue Length, PhysicalDisk(Total)\Avg. Disk sec/Transfer, PhysicalDisk(Total)\Avg. Disk Write Queue Length, PhysicalDisk(Total)\Current Disk Queue Length, Process(beast)\% Privileged Time, Process(beast)\Elapsed Time, Process(beast)\% Processor Time, Process(beast)\IO Data Bytes/sec, Process(beast)\IO Data Operations/sec, Process(beast)\IO Other Bytes/sec, Process(beast)\IO Other Operations/sec, Process(beast)\IO Read Bytes/sec, Process(beast)\IO Read Operations/sec, Process(beast)\IO Write Bytes/sec, Process(beast)\IO Write Operations/sec, Process(beast)\Page File Bytes, Process(beast)\Page File Bytes Peak, Process(beast)\Page Faults/sec, Process(beast)\Priority Base, Process(beast)\Thread Count, Process(beast)\Pool Nonpaged Bytes, Process(beast)\Pool Paged Bytes, Process(beast)\Private Bytes, Process(beast)\Virtual Bytes, Process(beast)\Virtual Bytes Peak, Process(beast)\Working Set, Process(beast)\Working Set—Private, Process(beast)\Working Set Peak, Processor(Total)\DPC Rate, Processor(Total)\DPCs Queued/sec, Processor(Total)\Interrupts/sec, System\Context Switches/sec, System\File Read Bytes/sec, System\File Read Operations/sec, System\File Write Bytes/sec, System\File Write Operations/sec, System\Processor Queue Length, and System\System Up Time. Of course, in other environments that use a different operating system, data associated with other I/O related parameters may be gathered.

A trained classifier 128 may analyze the data 126 and identify a predefined workload type 130 from among workloads types 130(1) to 130(M) (M>0, M not necessarily equal to N) that is closest (e.g., most similar) to the type 129 of a workload (e.g., determined based on the data 126) that the selected apps 110 present to the I/O stack 114. To illustrate, M may be between 10 and 30, such as about 25 different types of predefined workloads. For example, the classifier 128 may analyze the data 126(N) associated with the app 110(N) and determine that the I/O requests 112 to the I/O stack 114 present a workload type 129(N) that is similar (e.g., closest) to the predetermined workload type 130(M) and select the profile 132(M). The performance improvement tool 106 may apply the settings in the profile 132(M) to the computing device 102 to improve the performance of the app 110(N), e.g., as related to accessing the I/O stack 114. For example, the profile 132(M) may modify various parameters associated with the I/O stack 114, an operating system 148 of the computing device 102, the app 110(N), another set of parameters, or any combination thereof. Applying the profile 132(M) causes an increase in the speed at which the I/O requests 112 are executed, thereby reducing execution time and increasing throughput for the app 110(N).

The profile 132(M) may modify the size of caches, queues, counters, and other data structures in the I/O stack to improve the execution time of the I/O requests 112 of the app 110(N). For example, the profile 132(M) may modify parameters 134 of the file system 116, such as the type of file system (e.g., FAT, exFAT, NTFS, or the like), cluster size, volume size, whether compression is used and if so, what type of compression is used, encryption, and the like. The profile 132(M) may modify parameters 136 of the memory 118, such as how much of the memory 118 is allocated for paging, and other memory-related settings. The profile 132(M) may modify parameters 138 associated with the logical storage 120, such as how the logical storage 120 is implemented. The profile 132(M) may modify parameters 140 associated with the cache 122, such as a size of the cache 122, under what conditions the contents of the cache 122 are written to the physical storage 124, and the like. The profile 132(M) may modify parameters 142 associated with the pagefile 123, such as a size of the pagefile 123, under what conditions paging occurs, and the like. The profile 132(M) may modify parameters 144 associated with the physical storage 124. The profile 132(M) may modify various parameters 146 of the app 110(N), such as the location of a temporary file, the size of various internal caches and queues, and the like. For example, a video editor application may enable a location of a temporary file to be specified. If the temporary file is located on the same storage device as the app 110(N), then I/O requests to access portions of the application software and I/O requests to access the temporary file are placed in the same queue as they access the same storage device. In a system with two storage devices, the profile 132(M) may modify the parameters 146 to locate the temporary file (e.g., video file(s), photo file(s), audio file(s), illustration file(s), and the like) on a second storage device while the app 110(N) executes on a first storage device. By locating the temporary file on the second storage device, then I/O requests to access portions of the application software are placed in a first queue associated with the first storage device and I/O requests to access the temporary file are placed in a second queue associated with the second storage device. In this way, the app I/O requests and the temporary file I/O requests can be performed substantially in parallel.

The profiles 132 may modify one or more parameters 148 of the operating system 148 to improve performance of the apps 110. The parameters 150 may include process priorities 152, a power plan 154, Vsync 156, hyperthreading 158, core parking 160, superfetch 162, cache VMEM 164, memory compression 166, page combining 168, and other parameters 170. The process priorities 152 may include a priority level, e.g., high, normal, or low, associated with each process (e.g., an instance of a software application). The power plan 154 may be one of multiple plans, such as, for example, a high-performance plan, a balanced plan, and a power save plan. Of course, by varying various power features of the computing device 102, the power plan 154 may be selected from more than just the three plans provided as examples. Vsync 156 refers to Vertical Synchronization (Vsync), a display option to synchronize the frame rate output by an application (e.g., via a graphics card) with the monitor refresh rate. Because a graphic processor executes as fast as possible, extremely high frame rates may be output, e.g., faster than the display device is capable of displaying. Enabling VSync caps (e.g., throttles) the monitor's refresh rate and may avoid excessive strain on the graphics processor. Because VSync makes frames wait for when the monitor is ready, enabling Vsync can cause a slight delay in displaying input, such as keypresses, mouse input, and the like. Hyperthreading 158 provides simultaneous multithreading to improve parallelization of computations (doing multiple tasks at once) performed by multiple cores of a central processing unit (CPU). In core parking 160, cores of CPU that do not have threads scheduled for execution are parked (e.g., place in a low power state to conserve power). A parked core may take time to be unparked to enable the core to execute a thread, thereby causing a delay. Thus, turning core parking 160 may increase performance because an app does not wait for parked core to become available to execute a thread associated with the app. SuperFetch 162 is a pre-fetch feature of a memory manager of the operating system 148 that is used to cache (e.g., in RAM) frequently-accessed data instead of on a storage device because data can be retrieved from the cache faster than from the storage device. Cache virtual memory (vMem) 164 is memory that is allocated for virtualization (e.g., such as that provided by VMware® or similar software). For example, virtual memory addresses associated with each virtual machine is translated to physical memory addresses. Memory compression 166 is a memory management technique that utilizes data compression to reduce the size or number of paging requests to and from the storage. Page combining 168 is a technique to free up memory (RAM) in which the operating system 148 analyzes the content of memory, locates duplicate content, and keeps a single copy of particular content while removing duplicate content from the memory. Of course, these are merely examples of parameters that can be modified and other parameters 170 may be changed depending on the operating system (e.g., Windows, MacOS, iOS, Android, Linux, and the like), the operating system version, and so on.

Table 1 illustrates examples of the application and operating system parameters that each of the profiles 132 may modify.

TABLE 1

| Parameters | Applied | Possible Values |
| --- | --- | --- |
| Process priority | Per Process | High, normal, or low |
| Power plan | System wide | High performance, balanced, or power save |
| Vsync | System wide | on/off |
| Hyperthreading | System wide | on/off |
| Core parking | System wide | on/off |
| Superfetch | System wide | on/off |
| CacheVMEM | System wide | on/off |
| Memory Compression | System wide | on/off |
| Page Combining | System wide | on/off |

For a particular app 110(N) (e.g., AutoCAD) executing on a particular platform having a particular hardware configuration, the profile 132(M) associated with the app 110(N) may configure the parameters as illustrated in Table 2.

TABLE 2

| Setting | Value |
| --- | --- |
| Process priority | High |
| Power plan | High performance |
| Vsync | off |
| Hyperthreading | off |
| Core parking | off |
| Superfetch | on |
| CacheVMEM | on |
| Memory Compression | off |
| Page Combining | on |

The performance improvement tool 106 may provide recommendations 172 to improve performance of one or more of the apps 110. For example, the recommendations 172 may include "Increasing RAM from 8 GB to 16 GB will provide up to X % improvement in execution times for app 110(N)", "For app 110(N), switching from a first type of storage device (e.g., mechanical disk drive) to a second type of storage device (e.g., SSD) may provide up to Y % improvement in execution times, and switching to a third type of storage device (e.g., NVME) may provide up to Z % improvement in execution times." (X, Y, and Z>0). The recommendations 172 may include "Upgrading to the latest Precision workstation with 4.2 GHz 17 processor, 16 GB RAM, and 256 GB NVME memory will yield an improvement of X % for app 110(N)."

Thus, a performance improvement tool may provide a UI to enable a user to select one or more apps. When the tool detects that one of the selected apps is being executed (e.g., for the first time after being selected), the tool gathers data as to how the I/O requests of the selected app affect the I/O stack. The data is gathered for a predetermined period of time, such as 15, 30, 45, 60 minutes or the like. A classifier analyzes the gathered data and characterizes the workload presented by the I/O requests of the app to the I/O stack. The classifier compares the workload of the app to multiple predefined workloads and identifies a closest (e.g., most similar) workload from among the predefined workloads. The classifier selects a profile that corresponds to the closest workload. The process of gathering data, analyzing the data, identifying a most similar workload, and selecting a corresponding profile is repeated for each selected app. After a profile is associated with an app, each time the app is executed, the associated profile is applied. The profile is applied by modifying various parameters associated with (e.g., that affect) the I/O stack. Applying the profile modifies the parameters associated with the I/O stack to enable the I/O stack to execute the I/O requests from the app in a faster period of time, thereby reducing execution time and increasing throughput. For example, after a profile has been associated with each of the selected apps, when a first app begins to execute, the associated first profile is applied. When the user exits the first app and initiates execution of a second app, an associated second profile is selected and applied to reconfigure the parameters to improve throughput when the second app is executing.

Figure 2:
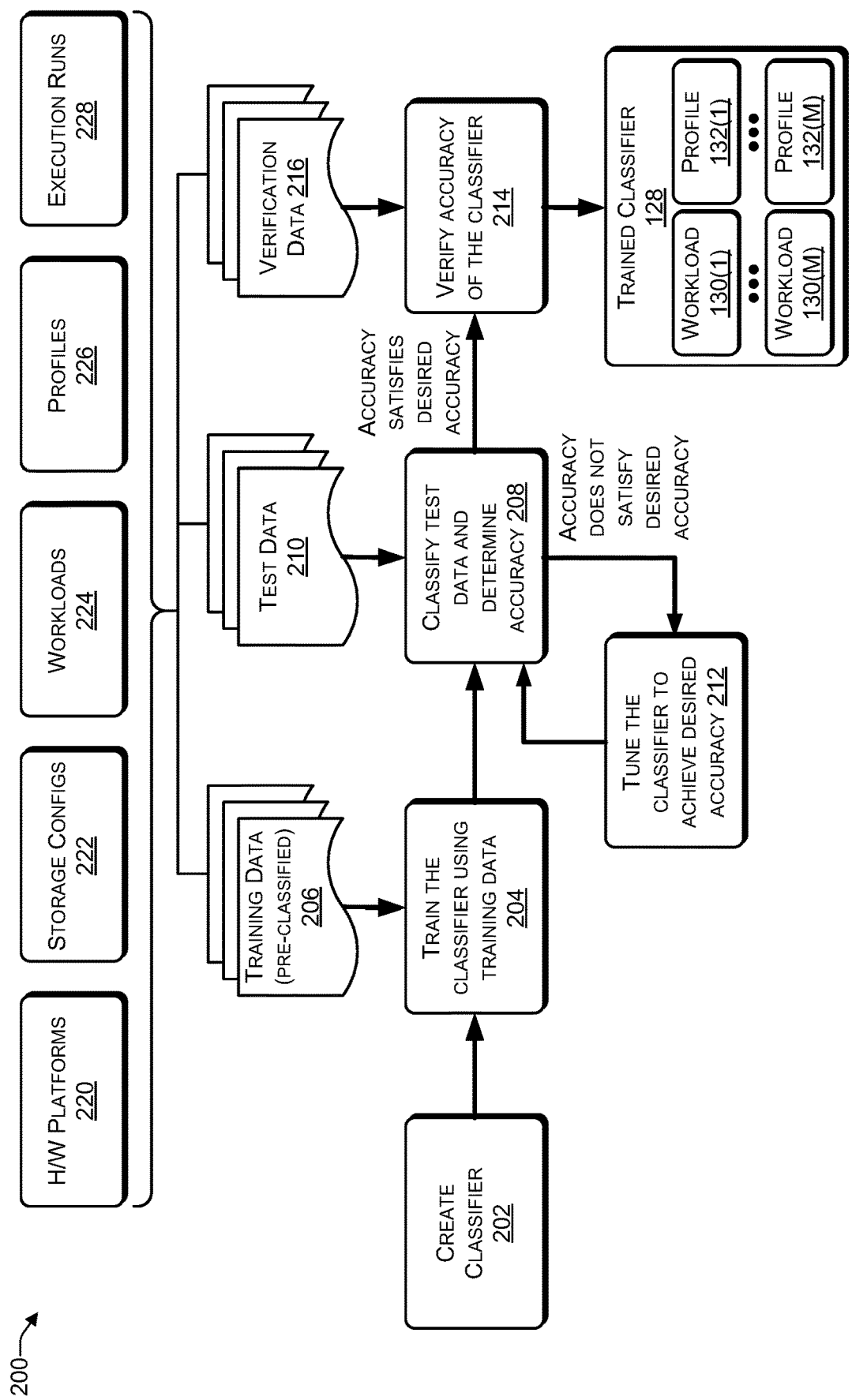
FIG. 2 is a block diagram illustrating training a classifier, according to some embodiments.

FIG. 2 is a block diagram 200 illustrating training a classifier, according to some embodiments. For example, the classifier 128 of FIG. 1 may be created and trained using the process 200.

At 202, the classifier is created. For example, software instructions that implement one or more machine learning algorithms (e.g., Random Forest, Neural Networks, or the like) may be written to create the classifier.

At 204, the classifier may be trained using training data 206. The training data 206 may include data that has been pre-classified (e.g., by a human, by another classifier, or a combination thereof).

At 208, the classifier may be used to classify test data 210. The test data 210 may have been pre-classified by a human, by another classifier, or a combination thereof. An accuracy with which the classifier classified the test data 210 may be determined. If the accuracy does not satisfy a desired accuracy, then the classifier may be tuned, at 212, to achieve a desired accuracy. The desired accuracy may be a predetermined threshold, such as ninety-percent, ninety-five percent, ninety-nine percent and the like. For example, if the classifier was eighty-percent accurate in classifying the test data and the desired accuracy is ninety-percent, then the classifier may be further tuned by modifying the algorithms based on the results of classifying the test data 210. 208 and 212 may be repeated (e.g., iteratively) until the accuracy of the classifier satisfies the desired accuracy.

When the accuracy of the classifier in classifying the test data 210 satisfies the desired accuracy, then the process may proceed to 214 where the accuracy of the classifier may be verified using verification data 216. The verification data 216 may have been pre-classified by a human, by another classifier, or a combination thereof. The verification process may be performed at 214 to determine whether the classifier exhibits any bias towards the training data 206 and/or the test data 210. For example, the verification data 216 may be documents that are different from both the test data 210 or the training data 206. After verifying, at 214, that the accuracy of the classifier satisfies the desired accuracy, the trained classifier 128 may be used to identify the set of workload types 130, with each of the workload types 130 affecting the I/O stack 114 in a different way as compared to others of the workload types 130.

The training data 206, the test data 210, and the verification data 216 may include data gathered by using different hardware platforms 220, with each of the hardware platforms 220 having a different storage configurations 222, such as different amount of RAM, different amount of physical storage, different types (e.g., mechanical, SSD, and the like) of physical storage, different storage interfaces (e.g., SATA, NVME, network attached storage (NAS) or the like. The data 206, 210, 216 may be gathered based on performing multiple execution runs 228 using different workloads 224 on various hardware platforms 220 and storage configurations 222 using different profiles 226. The classifier 128 may associate the profile 132(M) with the workload type 130(M) because, among the profiles 226, the profile 132(M) provides the fastest execution of I/O requests for the workload type 130(M).

Figure 3:
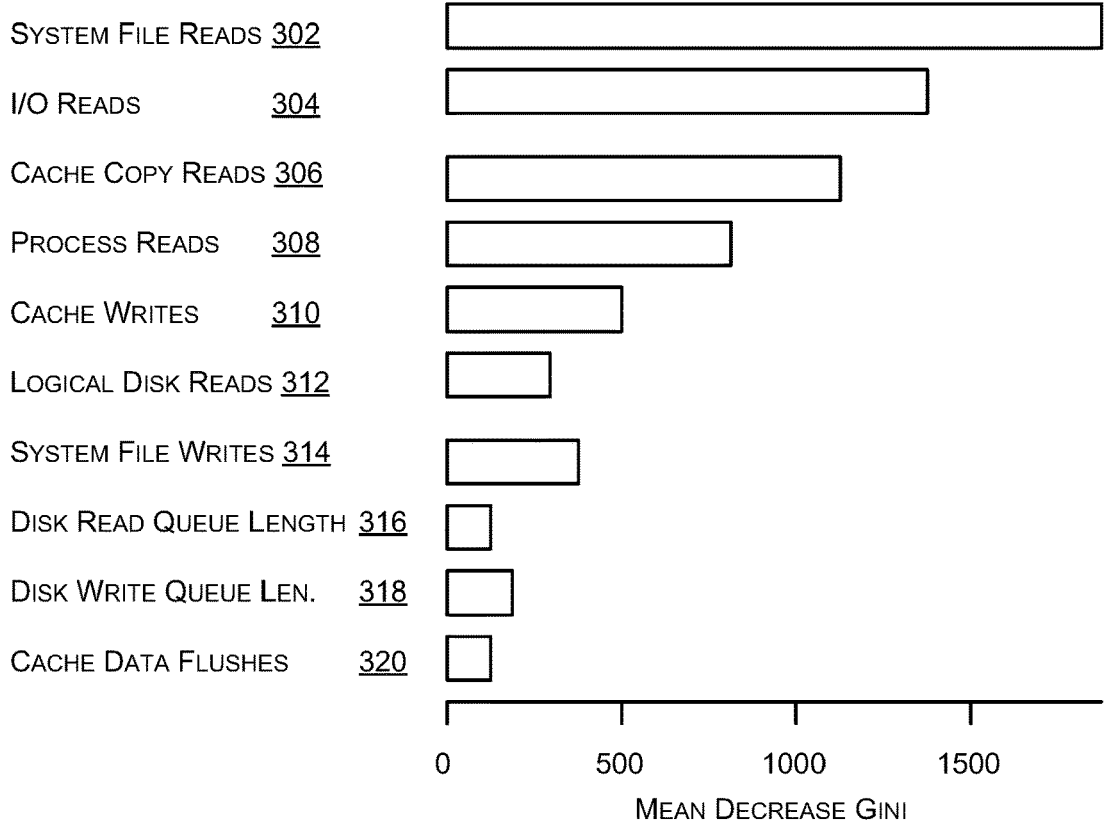
FIG. 3 is a block diagram illustrating examples of variables used to train a machine learning algorithm, according to some embodiments.

FIG. 3 is a block diagram 300 illustrating examples of variables used to train a machine learning algorithm, according to some embodiments. FIG. 3 illustrates examples of the variables influencing I/O throughput. For example, system file reads 302, I/O reads 304, copy cache reads 306, process reads 308, cache writes 310, logical disk reads 312, system file writes 314, disk read queue length 316, disk write queue length 318, and cache data flush 320.

A correlational analysis may be used to rank the dependency level between I/O related variables, such as the variables identified in FIG. 3. For example, when collecting the data 206, 210, 216 to train the classifier 128 of FIG. 1, approximately 700 different I/O related variables may be monitored. The variables may be ranked according to each variable's dependency level, e.g., how much the variable influences I/O, and the variables ranked, as illustrated in FIG. 3, based on mean decrease Gini. The mean decrease in Gini coefficient is a measure of how each variable contributes to the homogeneity of nodes and leaves in a resulting random forest. Variables that result in nodes with higher purity have a higher decrease in Gini coefficient, indicating a greater influence. A subset of the variables, e.g., the top X (e.g., 10<X<100) variables (e.g., having the highest mean decrease Gini), may be selected. The subset of variables is used to gather the data 126 associated with each of the selected apps 110. First, monitoring 700 different I/O related variables when gathering the data 126 is impractical in a runtime environment because the execution speed of the apps 110 would slow down significantly. Second, monitoring the top X variables is sufficient to characterize the workload of each of the apps 110 because the top X variables have the largest influence (e.g., greatest mean decrease Gini) over I/O.

For example, in FIG. 3, assume the top five variables 302, 304, 306, 308, and 310 are selected as a subset of the variables because these five variables have the most influence on I/O. After a user selects on the of the apps 110 and the selected one of the apps 110 begins execution, the variables 302, 304, 306, 308, and 310 may be measured and used to characterize the I/O workload. For example, if the data 126(1) associated with the app 110(1) indicates a relatively large number of system file reads 302 and I/O reads 304 and a relatively small number of cache copy reads 306, cache writes 310, and process reads 308, then the workload may be identified as most similar to the workload type 130(1) and assigned the profile 132(1). The profile 132(1) may configure operating system and application variables to improve the execution time for system file reads 302 and I/O reads 304. If the data 126(N) associated with the app 110(N) indicates a relatively large number of cache writes 310 and process reads 308 and a relatively small number of system file reads 302, I/O reads 304, and cache copy reads 306, then the workload may be identified as most similar to the workload type 130(M) and assigned the profile 132(M). The profile 132(M) may configure operating system and application variables to improve the execution time for cache writes 310 and process reads 308. In this way, each profile reduces the execution time for the most influential variables.

Figure 4:
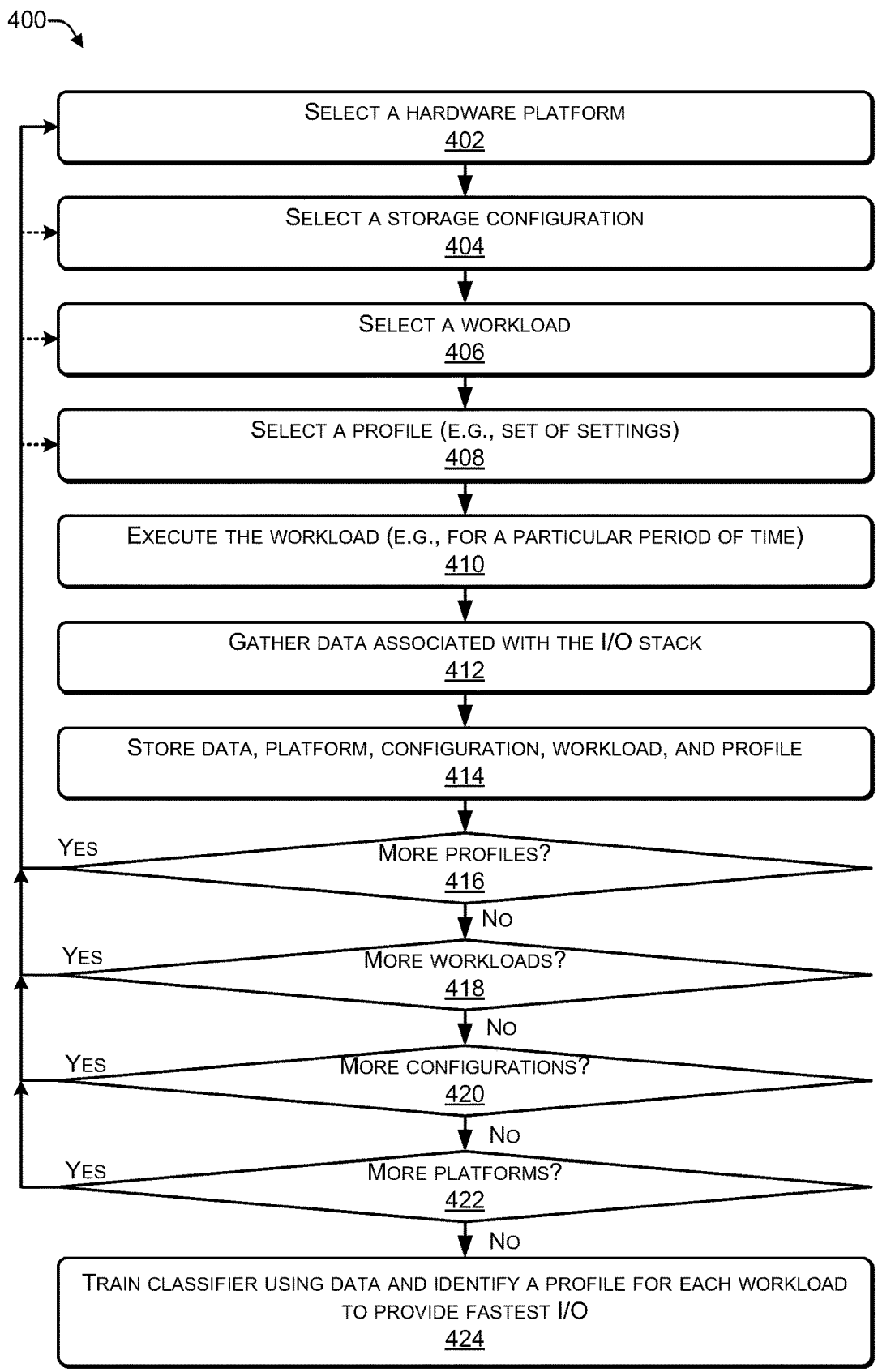
FIG. 4 is a flowchart of a process that includes training a classifier, according to some embodiments.
Figure 5:
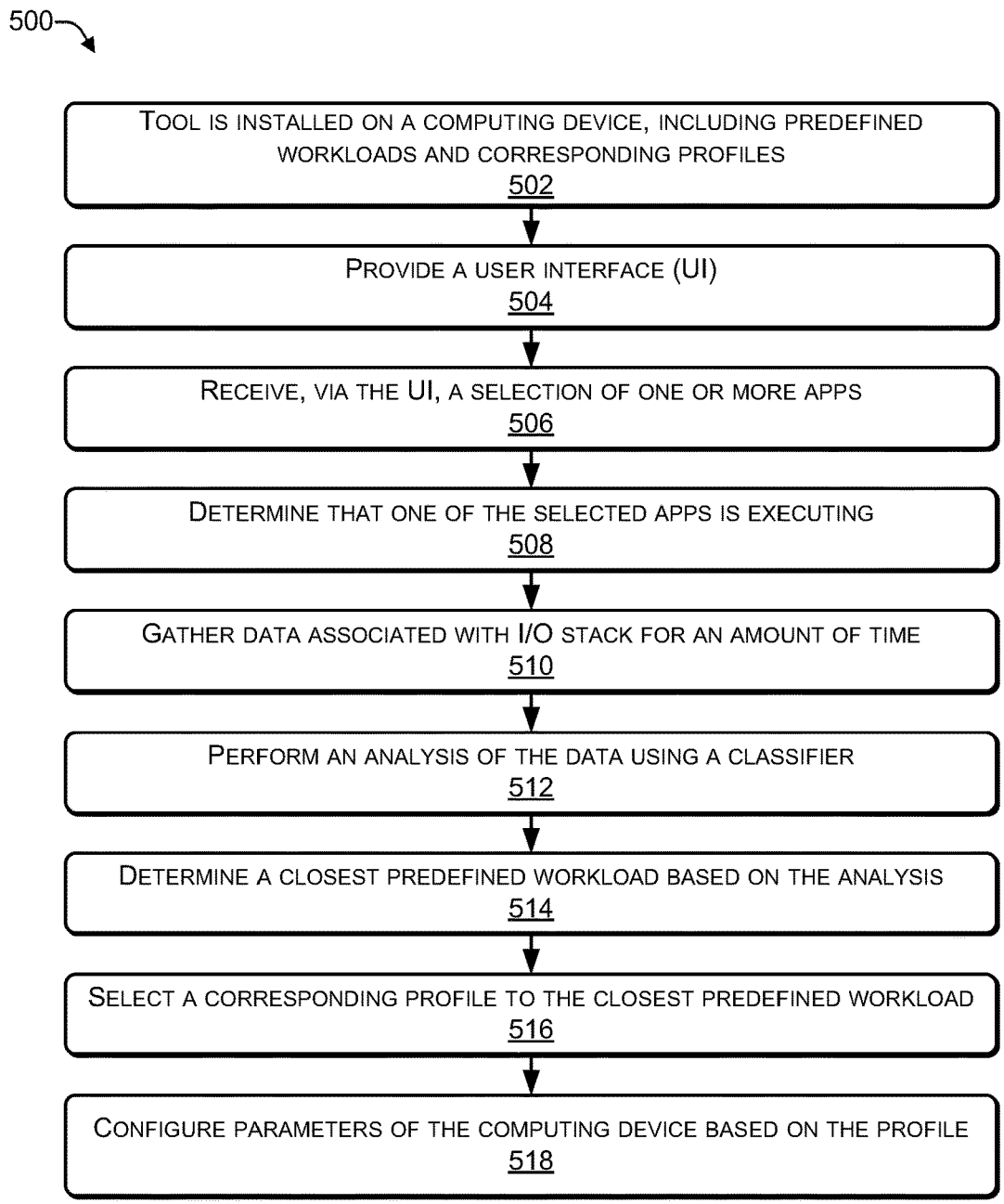
FIG. 5 is a flowchart of a process that includes configuring parameters associated with an I/O system based on a profile, according to some embodiments.

In the flow diagram of FIGS. 4 and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400 and 500 are described with reference to FIGS. 1, 2, and 3, as described above, although other models, frameworks, systems and environments may be used to implement this process.

FIG. 4 is a flowchart of a process 400 that includes training a classifier, according to some embodiments. For example, the process 400 may be performed in a non-production environment to create the classifier 128 of FIG. 1.

At 402, a hardware platform may be selected. At 404, a storage configuration may be selected. At 406, a workload may be selected. At 408, a profile may be selected.

At 410, the workload may be executed for a particular period of time. At 412, data associated with the I/O stack may be gathered. At 414, the gathered data, the platform, the configuration, the workload, and the profile may be stored.

At 416, a determination may be made whether there are more profiles. If there are more profiles, then the process may proceed to 408, where a next profile is selected. Thus, 408, 410, 412, 414, and 416 may be repeated until all profiles have been selected for a particular platform, a particular configuration, and a particular workload. If there are no more profiles to be selected, then the process proceeds to 418.

At 418, a determination may be made whether there are more workloads. If there are more workloads, then the process may proceed to 406, where a next workload is selected. Thus, 406, 408, 410, 412, 414, 416, and 418 may be repeated until all workloads have been selected for a particular platform and a particular configuration. If there are no more workloads to be executed, then the process proceeds to 418.

At 420, a determination may be made whether there are more configurations. If there are more configurations, then the process may proceed to 404, where a next configuration is selected. Thus, 404, 406, 408, 410, 412, 414, 416, 418, and 420 may be repeated until all configurations have been selected for a particular platform. If there are no more configurations, then the process proceeds to 422.

At 422, a determination may be made whether there are more platforms. If there are more platforms, then the process may proceed to 402, where a next hardware platform is selected. Thus, 402, 404, 406, 408, 410, 412, 414, 416, 418, 420, and 422 may be repeated until all platforms have been selected. If there are no more platforms, then the process proceeds to 424.

At 424, the classifier may be trained, as described in FIG. 2, using the data gathered in 402, 404, 406, 408, 410, 412, 414, 416, 418, 420, and 422. The classifier may be used to identify a particular profile from multiple profiles that provides a fastest I/O execution for each workload.

FIG. 5 is a flowchart of a process 500 that includes configuring parameters associated with an I/O system based on a profile, according to some embodiments. The process 500 may be performed by the performance improvement tool 106 of FIG. 1.

At 502, the performance improvement tool ("tool") may be installed on a computing device (e.g., a workstation, such as Dell® Precision). The tool may include predefined workloads and corresponding profiles. For example, in FIG. 1, the performance improvement tool 106 (e.g., Dell® Precision Optimizer or similar) may be installed on the computing device 102 (e.g., Dell® Precision workstation). The performance improvement tool 106 may include the workload types 130 and the profiles 132.

At 504, the tool may display a UI. At 506, a selection of one or more apps (e.g., for which performance is to be improved, e.g., "optimized") may be received via the UI. For example, in FIG. 1, the performance improvement tool 106 may provide the app selection UI 108 to enable a user to select one or more apps, such as apps 110(1) to app 110(N) (N>0) from among the apps 104.

At 508, the process may determine that one of the selected apps is executing (e.g., after having been selected via the UI). At 510, data associated with how the app uses the I/O stack may be gathered for a predetermined period of time. For example, in FIG. 1, the performance improvement tool 106 may monitor the input/output (I/O) requests 112 for a particular one of the selected apps 110 when the selected app is executing and gather data 126 associated with how the selected app uses the I/O stack 114. The data 126 may be gathered across each of the layers of the I/O stack 114 for a predetermined period of time (e.g., 15, 30, 45, 60 minutes or the like).

At 512, an analysis of the data may be performed using a machine learning algorithm (e.g., a classifier). At 514, based on the analysis, a closest predefined workload may be determined. At 516, a profile corresponding to the closest predefined workload may be selected. At 518, the process may configure one or more parameters of the computing device based on the profile. For example, in FIG. 1, the classifier 128 may analyze the data 126(N) associated with the app 110(N) and determine that the I/O requests 112 to the I/O stack 114 present a workload that is similar (e.g., closest) to the predetermined workload type 130(M) and select the profile 132(M). The performance improvement tool 106 may apply the settings in the profile 132(M) to the computing device 102 to improve the performance of the app 110(N), e.g., as related to accessing the I/O stack 114.

Figure 6:
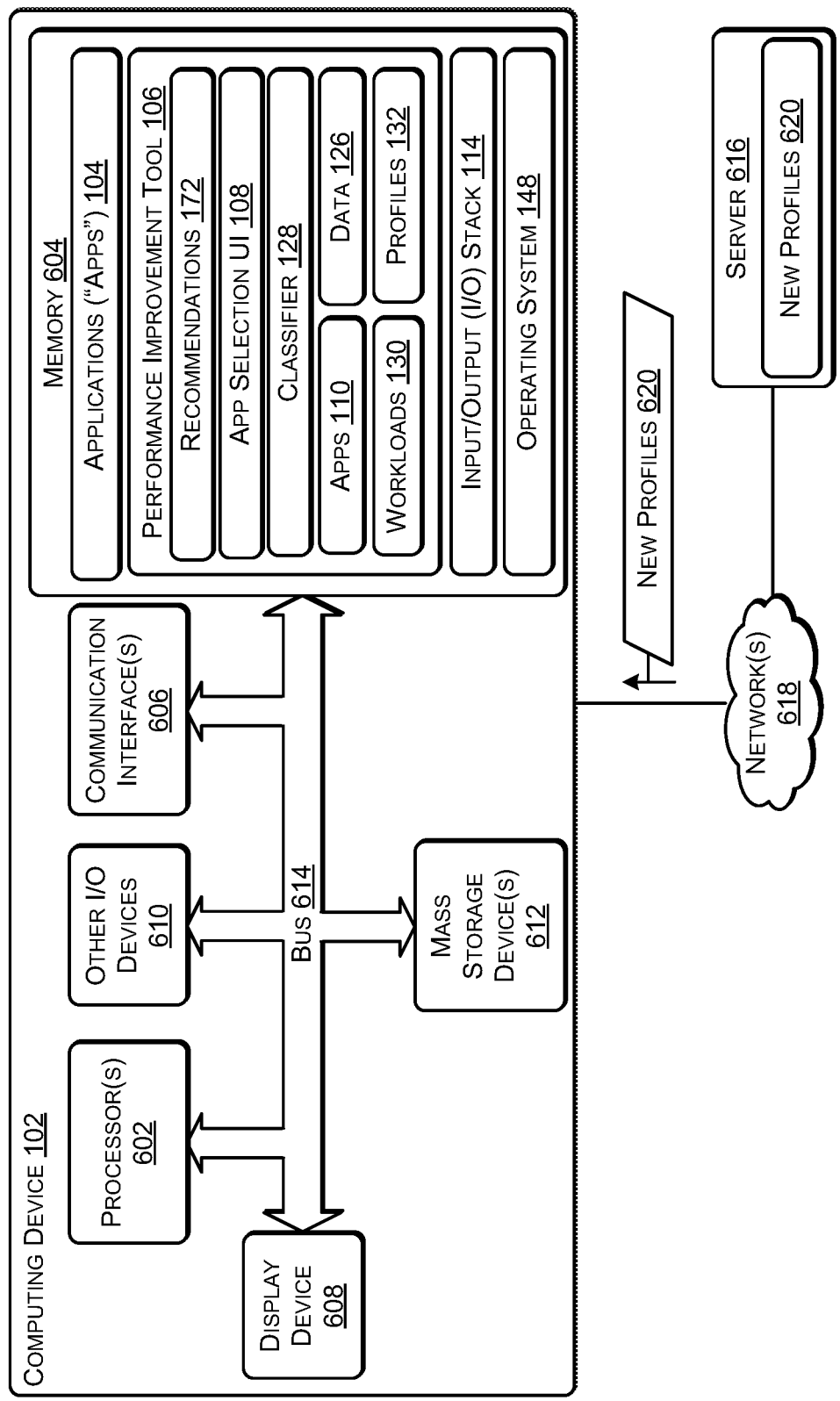
FIG. 6 illustrates an example configuration of a computing device that can be used to implement the systems and techniques described herein.

FIG. 6 illustrates an example configuration of the computing device 102 that can be used to implement the systems and techniques described herein.

The computing device 600 may include one or more processors 602 (e.g., central processing unit (CPU), graphics processing unit (GPU), and the like), a memory 604, communication interfaces 606, at least one display device 608, other input/output (I/O) devices 610 (e.g., keyboard, trackball, and the like), and one or more mass storage devices 612 (e.g., disk drive, solid state disk drive, or the like), configured to communicate with each other, such as via one or more system buses 614 or other suitable connections. While a single system bus 614 is illustrated for ease of understanding, it should be understood that the system buses 614 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 602 are one or more hardware devices that may include a single processing unit or a number of processing units, all of which may include single or multiple computing units or multiple cores. The processors 602 may include a graphics processing unit (GPU) that is integrated into the CPU or the GPU may be a separate processor device from the CPU. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processors 602 to perform the various functions described herein. For example, memory 604 may include both volatile memory and non-volatile memory (e.g., random access memory (RAM), read only memory (ROM), or the like) devices. Further, mass storage devices 612 may include hard disk drives, solid-state drives, removable media (e.g., secure digital (SD) cards), including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein and may be any type of non-transitory media capable of storing computer-readable, processor-executable program instructions as computer program code that can be executed by the processors 602 as a particular machine configured for carrying out the operations and functions described in the implementations herein.

The computing device 600 may include one or more communication interfaces 606 for exchanging data via a network 618. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

The display device 608 may be used for displaying content (e.g., information and images) to users. Other I/O devices 610 may be devices that receive various inputs from a user and provide various outputs to the user, and may include a keyboard, a touchpad, a mouse, a printer, audio input/output devices, and so forth.

The computer storage media, such as memory 604 and mass storage devices 612, may be used to store software and data. For example, the computer storage media may be used to store the apps 104, the performance improvement tool 106 (including the recommendations 172, the app selection UI 108, the classifier 128, the selected apps 110, the data 126, the workload types 130, and the profiles 132), the I/O stack 114, and the operating system 148, as well as other applications (e.g., device drivers) and other data.

The performance improvement tool 106 may enable a user to select the apps 110, from among the apps 104, causing the tool 106 to identify a type of workload that the selected apps present to the I/O stack 114 and select a corresponding one of the profiles 132. After the user has selected the apps 110, the performance improvement tool 106 may determine when one of the apps 110 is being executed by the computing device 102 and monitor the I/O requests from the selected app to the I/O stack 114 for a predetermined amount of time (e.g., 15, 30, 45, 60 minutes or the like). During this time, the performance improvement tool 106 may gather the data 126 to characterize the workload presented by the selected app and select one of the profiles 132. Typically, after one of the profiles 132 has been selected and associated with the selected 110, the process of gathering the data 126 may not subsequently be performed. However, the user may instruct the performance improvement tool 106 to gather the data 126 associated with one of the apps 110 and automatically (e.g., without human interaction) select one of the profiles 132 by opening the app selection UI 108 and selecting one of the apps 110. For example, if a provider of the performance improvement tool 106 makes improvements to the profiles 132 to create new profiles 620, the user may download the new profiles 620 from a server 616 using the network 618. After installing the new profiles 620, the user may instruct the performance improvement tool 106 to gather the data 126 associated with one of the apps 110 and select one of the profiles 132 by opening the app selection UI 108 and selecting one of the apps 110.

The performance improvement tool 106 may monitor the input/output (I/O) requests 112 for each of the selected apps when each of the selected apps is executing (e.g., the first time each of the selected apps is being executed) and gather data 126 associated with how the selected app uses the I/O stack 114. The data 126 may be gathered across each of the layers of the I/O stack 114. The classifier 128 may analyze the data 126 and identify one of predefined workload types 130 that is closest (e.g., most similar) to the type of workload that the selected app presents to the I/O stack 114. The performance improvement tool 106 may apply the settings in the corresponding profile 132 to the computing device 102 to improve the performance of the selected app. For example, the profiles 132 may modify various parameters associated with the I/O stack 114, the operating system 148, the selected app 110, another set of parameters, or any combination thereof. Applying the selected profile 132 causes an increase in the speed at which the I/O requests 112 are executed, thereby reducing execution time and increasing throughput for the selected app.

Figure 7:
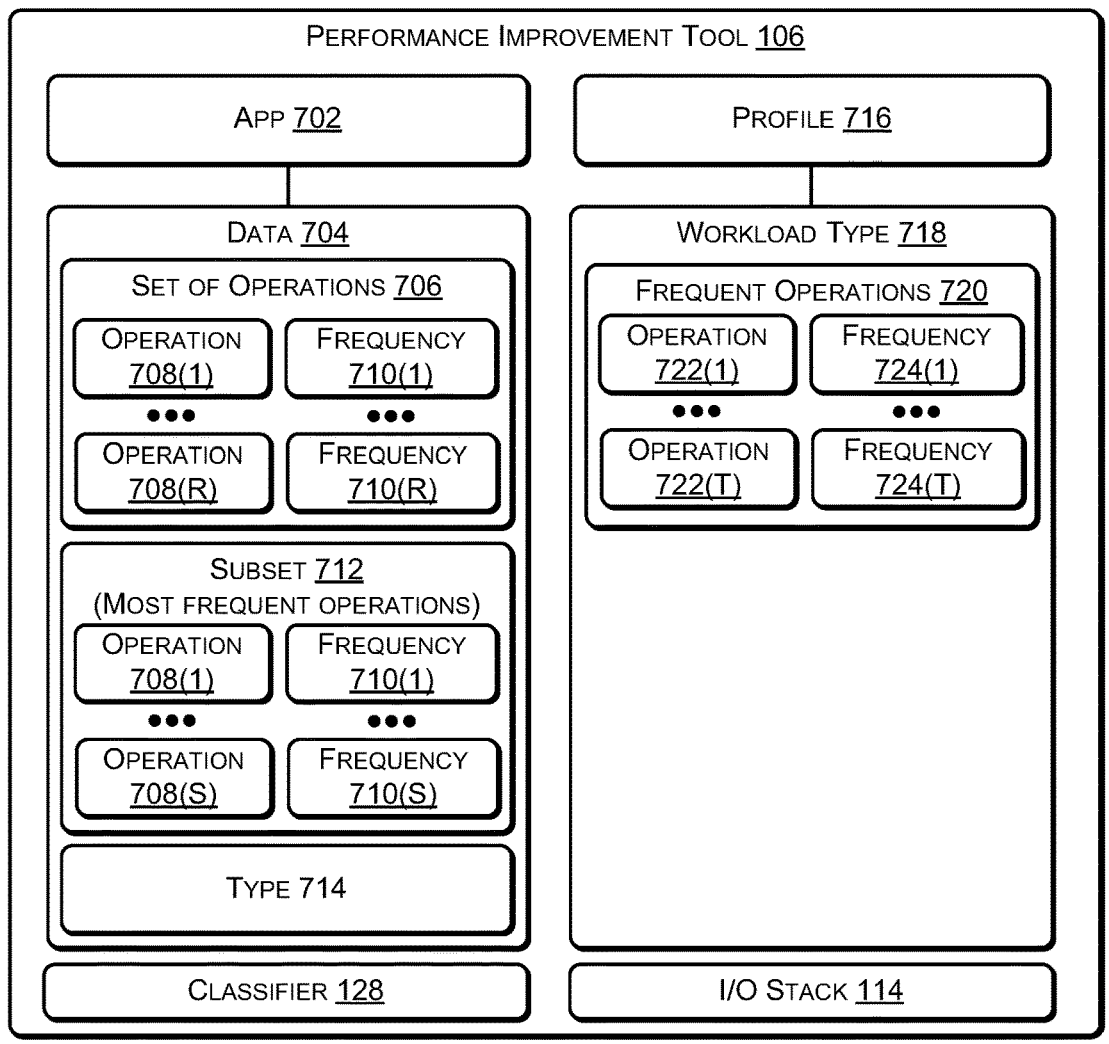
FIG. 7 is a block diagram illustrating classifying a workload of an app, according to some embodiments.

FIG. 7 is a block diagram 700 illustrating classifying a workload of an app, according to some embodiments. After a user selects an app, such as the app 702 (e.g., one of the apps 110 of FIG. 1), the performance tool 106 may gather data 704 associated with how the app 702 uses the I/O stack 114. For example, the data 704 may include a set of operations 706 (e.g., read, write, and the like) performed to the I/O stack 114. The performance tool 106 may determine a how frequently each operation 708 is performed. For example, the performance tool 106 may determine that the app 702 performs operations 708(1) to 708(R) (R>0) with a corresponding frequency, e.g., that the operation 708(1) is performed with a frequency of 710(1) and the operation 708(R) is performed with a frequency of 710(R).

The classifier 128 may identify a subset 712 of the set of operations 706 that includes the most frequently performed operations from the set of operations 706. For example, the operations 708(1) to 708(S) with corresponding frequencies 710(1) to 710(S), where S<R, may be selected for the subset 712. For example, the subset 712 may determined by selecting those operations 708 that have a corresponding frequency 710 that satisfies a particular threshold (e.g., performed at least V times per second), a particular percentage (e.g., an individual operation represents at least W % of the total number of operations performed in a particular time interval, V=5%, 10%, or the like), the top N (N>0, e.g., N=5, 10, or the like) most frequently performed operations from the set of operations 706, or based on another criteria to identify the subset 712 that includes the most frequently performed operations from the set of operations 706.

The classifier 128 may determine (e.g., classify), based on the subset 712, a type 714 (e.g., one of the types 129 of FIG. 1) of the workload that the app 702 presents to the I/O stack 114. For example, the classifier 128 may determine that the type 714 of the app 702 is most similar to a workload type 718 (e.g., one of the workload types 130 of FIG. 1). For example, the workload type 718 may be associated with frequent operations 720, e.g., operations 722(1) to 722(T) (T>0) having a corresponding frequency 724(1) to 724(T), respectively. To illustrate, the subset 712 may be most similar to the frequent operations 720, e.g., the operations 708 may be similar (or identical) to the operations 722 and the frequencies 710 may be similar (or identical) to the frequencies 724. For example, if the subset 712 includes a particular type of read operation and a particular type of write operation, then the frequent operations 720 may include the particular type of read operation and the particular type of write operation. After determining that (e.g., classifying) the type 714 of the workload presented by the app 702 is most similar to the workload type 718, the classifier 128 may select the profile 716 (e.g., one of the profiles 132 of FIG. 1). The performance improvement tool 106 may configure various parameters associated with the computing device 102 of FIG. 1 based on the profile 716 to improve execution (e.g., reduce execution time) of the subset 712. In this way, the data 704 gathered by monitoring the operations 708 performed by the app 702 to the I/O stack 114 can be classified by the classifier 128 as the type 714 of the workload associated with the app 702. The classifier 128 determines that the type 714 is most similar to the workload type 718, selects the corresponding profile 716 and configures the parameters of the computing device to improve performance of the app 702. Thus, the performance of the app 702 can be improved even when the app 702 is a new application, a new version of an existing application, or if the user uses the app 702 in a way that is different from how other users use the app 702. The profile 716 is thus selected according to the way in which the app 702 is used. Further, if the user changes the way in which the app 702 is used, the user can re-run the performance improvement tool 106 to monitor the new way in which the app 702 is being used, characterize the type of workload, and select a different profile based on the new usage.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   determining, by one or more processors of a computing device, that a selected application is performing operations to an input/output stack of the computing device;
   ordering, according to a frequency of occurrence, the operations performed by the selected application to the input/output stack;
   determining, by the one or more processors, a subset of the operations comprising a plurality of most frequently performed operations performed by the selected application to the input/output stack;
   performing a comparison of the subset of the operations to frequent operations associated with each of a predefined set of workload types;
   classifying, by a classifier executed by the one or more processors, the subset of the operations performed by the selected application as a particular workload type from a predefined set of workload types, wherein the classifier comprises a machine learning algorithm trained to classify input/output operations as a type of workload;
   selecting, by the one or more processors, a particular profile corresponding to the particular workload type from a plurality of predefined profiles based at least in part on the particular workload type and on the comparison; and
   modifying, by the one or more processors and based on the particular profile, a plurality of parameters to create modified parameters to reduce an execution time of the selected application performing the operations to the input/output stack using the modified parameters.

2. The method of claim 1, wherein modifying the plurality of parameters to create the modified parameters comprises:
   modifying a process priority associated with the selected application to a highest priority;
   modifying a power plan of an operating system to a high-performance power plan;

modifying a hyperthreading feature associated with the one or more processors;
disabling a core parking feature associated with the one or more processors;
disabling a compression feature to compress data stored in a random-access memory; and
modifying a page combining feature of the operating system to remove duplicates of content stored in the random-access memory.

3. The method of claim 1, wherein modifying the plurality of parameters to create the modified parameters comprises:
modifying a vertical synchronization feature associated with synchronizing a frame rate output of the selected application with a monitor refresh rate of a display device associated with the computing device; and
modifying a pre-fetch feature associated with the one or more processors to store frequently accessed data in a random-access memory of the computing device.

4. The method of claim 1, further comprising:
displaying a user interface; and
receiving, via the user interface, a user selection of a particular application of a plurality of applications to create the selected application.

5. The method of claim 1, wherein before ordering, according to the frequency of occurrence, the operations performed by the selected application to the input/output stack, the method comprises:
gathering over a predetermined interval of time, data associated with the selected application performing the operations to the input/output stack, wherein the predetermined interval of time comprises one of fifteen minutes, thirty minutes, forty-five minutes, or sixty minutes and
performing an analysis of the data.

6. The method of claim 1, wherein the input/output stack comprises:
a file system used by the computing device;
a random-access memory used by the computing device;
a logical storage used by an operating system;
a cache allocated in the random-access memory by the operating system;
a pagefile used by the operating system; and
physical storage accessible to the operating system.

7. A computing device comprising:
one or more processors; and
one or more non-transitory computer readable media storing instructions executable by the one or more processors to perform operations comprising:
determining that a selected application is performing operations to an input/output stack of the computing device;
ordering, according to a frequency of occurrence, the operations performed by the selected application to the input/output stack;
determining a subset of the operations comprising a plurality of most frequently performed operations performed by the selected application to the input/output stack;
performing a comparison of the subset of the operations to frequent operations associated with each of a predefined set of workload types;
classifying, by a classifier, the subset of the operations as a particular workload type from a predefined set of workload types, wherein the classifier comprises a machine learning algorithm trained to classify input/output operations as a type of workload;
selecting a particular profile corresponding to the particular workload type from a plurality of predefined profiles based at least in part on the particular workload type and on the comparison; and
modifying, based on the particular profile, a plurality of parameters to create modified parameters, the modified parameters reducing an execution time of the selected application performing the operations to the input/output stack using the modified parameters.

8. The computing device of claim 7, wherein modifying the plurality of parameters to create the modified parameters comprises at least one of:
modifying a process priority associated with the selected application to a highest priority;
modifying a power plan of an operating system to a high-performance power plan;
modifying a hyperthreading feature associated with the one or more processors;
disabling a core parking feature associated with the one or more processors;
disabling a compression feature to compress data stored in a random-access memory; or
modifying a page combining feature of the operating system to remove duplicates of content stored in the random-access memory.

9. The computing device of claim 7, wherein modifying the plurality of parameters to create the modified parameters comprises:
modifying a vertical synchronization feature associated with synchronizing a frame rate output of the selected application with a monitor refresh rate of a display device associated with the computing device.

10. The computing device of claim 7, further comprising:
displaying a user interface; and
receiving, via the user interface, a user selection of a particular application of a plurality of applications to create the selected application.

11. The computing device of claim 7, wherein the input/output stack comprises:
a file system used by the computing device;
a random-access memory used by the computing device;
a logical storage used by an operating system;
a cache allocated in the random-access memory by the operating system;
a pagefile used by the operating system; and
physical storage accessible to the operating system.

12. One or more non-transitory computer readable media storing instructions executable by one or more processors of a computing device to perform operations comprising:
determining that a selected application is performing operations to an input/output stack of the computing device;
ordering, according to a frequency of occurrence, the operations performed by the selected application to the input/output stack;
determining, by the one or more processors, a subset of the operations comprising a plurality of most frequently performed operations performed by the selected application to the input/output stack;
performing a comparison of the subset of the operations to frequent operations associated with each of a predefined set of workload types;
classifying, by a classifier, the subset of the operations performed by the selected application as a particular workload type from a predefined set of workload types, wherein the classifier comprises a machine learning algorithm trained to classify input/output operations as a type of workload;

selecting, based at least in part on the particular workload type and on the comparison, a particular profile from a plurality of predefined profiles corresponding to the particular workload type; and modifying, based on the particular profile, a plurality of parameters to create a modified parameters, the modified parameters reducing an execution time of the selected application performing the operations to the input/output stack using the modified parameters.

13. The one or more non-transitory computer readable media of claim 12, wherein modifying the plurality of parameters to create the modified parameters comprises at least one of:

modifying a process priority associated with the selected application to a highest priority;

modifying a power plan of an operating system to a high-performance power plan;

modifying a hyperthreading feature associated with the one or more processors;

disabling a core parking feature associated with the one or more processors;

disabling a compression feature to compress data stored in a random-access memory; or modifying a page combining feature of the operating system to remove duplicates of content stored in the random-access memory.

14. The one or more non-transitory computer readable media of claim 12, wherein modifying the plurality of parameters to create the modified parameters comprises at least one of:

modifying a vertical synchronization feature associated with synchronizing a frame rate output of the selected application with a monitor refresh rate of a display device associated with the computing device; or modifying a pre-fetch feature associated with the one or more processors to store frequently accessed data in a random-access memory of the computing device.

15. The one or more non-transitory computer readable media of claim 12, further comprising:

displaying a user interface; and receiving, via the user interface, a user selection of a particular application of a plurality of applications to create the selected application.

16. The one or more non-transitory computer readable media of claim 12, wherein the classifier is trained using multiple hardware platforms, multiple storage configurations, multiple workloads, and the predefined plurality of profiles to classify a workload based on input/output operations performed by a particular application and identify a profile to increase performance of the input/output operations.

17. The one or more non-transitory computer readable media of claim 12, wherein the input/output stack comprises:

a file system used by the computing device;

a random-access memory used by the computing device;

a logical storage used by an operating system;

a cache allocated in the random-access memory by the operating system;

a pagefile used by the operating system; and physical storage accessible to the operating system.

* * * * *